United States Patent
Edelmann et al.

(10) Patent No.: US 8,105,523 B2
(45) Date of Patent: Jan. 31, 2012

(54) REINFORCEMENT BEAM AS WELL AS METHOD AND FIBER LAMINATE FOR MANUFACTURING THE REINFORCEMENT BEAM

(75) Inventors: Klaus Edelmann, Bremen (DE); Jens Bold, Köln (DE)

(73) Assignee: Airbus Deutschland GmbH, Hamburg (DE)

( * ) Notice: Subject to any disclaimer, the term of this patent is extended or adjusted under 35 U.S.C. 154(b) by 6 days.

(21) Appl. No.: 11/921,606

(22) PCT Filed: Jun. 20, 2006

(86) PCT No.: PCT/EP2006/063364
§ 371 (c)(1),
(2), (4) Date: Aug. 1, 2008

(87) PCT Pub. No.: WO2006/136560
PCT Pub. Date: Dec. 28, 2006

(65) Prior Publication Data
US 2009/0026315 A1     Jan. 29, 2009

(30) Foreign Application Priority Data
Jun. 22, 2005   (DE) .................. 10 2005 028 765

(51) Int. Cl.
*B29C 70/30* (2006.01)
(52) U.S. Cl. ......... 264/258; 264/136; 264/137; 264/320
(58) Field of Classification Search ............ 52/837, 52/841, 846, 847; 264/136, 137, 258, 319, 264/320, 324
See application file for complete search history.

(56) References Cited

U.S. PATENT DOCUMENTS

| | | | |
|---|---|---|---|
| 4,177,306 A * | 12/1979 | Schulz et al. | 428/107 |
| 4,576,849 A * | 3/1986 | Gardiner | 428/119 |
| 4,811,540 A | 3/1989 | Kallies et al. | |
| 6,276,105 B1 * | 8/2001 | Wycech | 52/309.8 |
| 6,355,133 B1 * | 3/2002 | Williams | 156/296 |
| 7,670,525 B2 * | 3/2010 | Weidmann et al. | 264/255 |
| 2004/0074587 A1 | 4/2004 | Koerwien et al. | |
| 2004/0134593 A1 | 7/2004 | Ishibashi et al. | |

FOREIGN PATENT DOCUMENTS

| | | |
|---|---|---|
| DE | 19809264 | 9/1999 |
| DE | 10153875 | 5/2003 |
| WO | WO 02/42044 | 5/2002 |
| WO | WO 2005/011962 | 2/2005 |

* cited by examiner

*Primary Examiner* — Brian Glessner
*Assistant Examiner* — Patrick Maestri
(74) *Attorney, Agent, or Firm* — Greer, Burns & Crain, Ltd.

(57) ABSTRACT

Disclosed is a reinforcement blank, in particular a curved ring frame segment for fuselage cells of aircraft, comprising a synthetic material that is reinforced by at least one fiber laminate. The fiber laminate includes at least one full-area layer with a first fiber direction and at least one full-area layer with a second fiber direction, wherein at least one further layer with a third fiber direction is arranged in a peripheral area of the fiber laminate. This results in an orientation of the fibers in the individual layers of the fiber laminate used to reinforce the reinforcement beam that is overall suitable for the applied load, so that the reinforcement beam withstands high mechanical loads at a minimum weight.

8 Claims, 5 Drawing Sheets

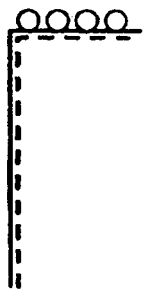 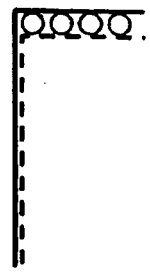 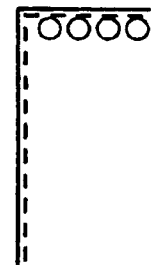
Fig. 9　　　　Fig. 10　　　　Fig. 11
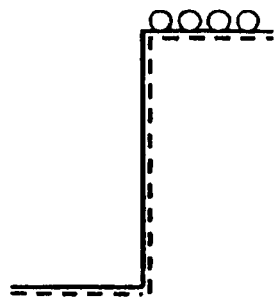 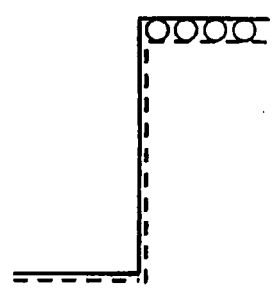 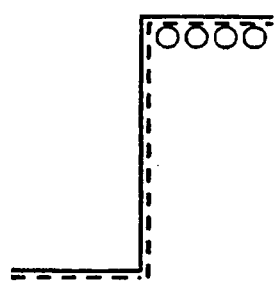
Fig. 12　　　　Fig. 13　　　　Fig. 14
 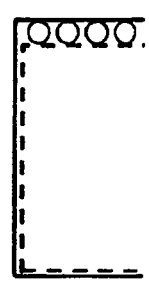 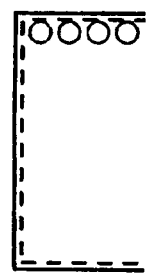
Fig. 15　　　　Fig. 16　　　　Fig. 17

REINFORCEMENT BEAM AS WELL AS METHOD AND FIBER LAMINATE FOR MANUFACTURING THE REINFORCEMENT BEAM

FIELD OF THE INVENTION

The present invention concerns a reinforcement beam, and in particular a curved ring frame segment for fuselage cells of aircraft, comprising a synthetic material that is reinforced by at least one fiber laminate.

BACKGROUND OF THE INVENTION

Furthermore, the present invention concerns a method for manufacturing a reinforcement beam, in particular of a curved ring frame segment, for a fuselage cell of an aircraft comprising a synthetic material that is reinforced by at least one fiber laminate.

Furthermore, the present invention concerns a fiber laminate for manufacturing a reinforcement beam, in particular of a ring frame segment, wherein the fiber laminate comprises at least one layer with a first fiber direction and at least one layer with a second fiber direction as well as a further layer with a third fiber direction.

Ordinarily, ring frames are used in airplanes to reinforce the fuselage cells. These ring frames are mostly made of aluminum beams. The manufacturing of longer ring frame segments or circular ring frames with aluminum beams ordinarily causes no particular problems, since the aluminum beams can be adapted comparatively easily to the fuselage curvature of the fuselage cells by bending them.

During flight, such a ring frame having, for example, a Z-shaped cross section for reinforcing a fuselage cell of an aircraft is mainly subjected to shear and/or transverse forces in the region of the vertical beam. The bent beam sections, on the other hand, are mainly subjected to tensile and/or compression forces. The differentiation between shear and/or transverse forces on the one hand and tensile and/or compression forces on the other hand in different portions of the ring frame is largely irrelevant in the case of aluminum ring frames, since metal materials ordinarily have isotropic material properties.

To achieve further weight savings, however, individual components of fiber-reinforced compound materials, in particular carbon fiber-reinforced epoxy resins, are increasingly used in aircraft construction. The mechanical properties of fiber-reinforced compound materials are ordinarily strongly anisotropic, so that the direction of the main mechanical load should preferably coincide with a main fiber direction. In order to accomplish optimum mechanical properties, it is therefore necessary to adapt or adjust in particular the orientation of the fiber reinforcement to the directions of the applied forces.

Considerable difficulties are created in this context by the introduction of a fabric, of fiber bundles or a combination of these in order to accomplish the fiber reinforcement in the case of, for example, components that are round, oval or have the shape of a segment of a circle. The reason for this is that in such cases, it is often indispensable to let at least a main fiber direction run parallel to the circumferential contour of the component, in order to accomplish optimum rigidity.

Once the fiber reinforcement is formed, the actual component, such as a reinforcement beam for forming a ring frame or a ring frame segment, is manufactured using a method known in the art, such as the so-called resin transfer molding (RTM) method. Alternatively, it is also possible to use continuous injection molding for the manufacture.

If the reinforcement of such a component is to be realized with a fabric or the like, then it is possible to line up short fabric strips in sections along the circumference or perimeter. However, this leads to the disadvantage of a relatively large number of seams due to the necessary division into parts. It is possible to reduce the number of seams with an overlapping arrangement of fabric strips, but this leads to thickened portions in the region of the overlaps.

Furthermore, it is possible to accomplish such a fiber reinforcement by wrapping a long fiber or a long fiber bundle several times around the entire component. This approach entails a higher cost, but avoids unnecessary seams in the fiber reinforcement.

Finally, there is the possibility to cut substantially diagonal strips from a section of a fabric course. Such strips that are cut diagonally from a fabric course can be draped, i.e., laid out in a curved manner in a plane without curling up into creases or folds. Therefore, such fabric strips are in principle suitable for a reinforcement of the perimeter of components with small dimensions that are round, oval or have the shape of a circle segment, because in the ideal case only a single seam is caused. However, such strips have the disadvantage that due to the limited width of fabric courses, they can only be fabricated with a limited length, so that larger components, such as ring frames or the like, cannot be manufactured in this manner.

SUMMARY OF THE INVENTION

It is therefore an object of the present invention to provide a component made of a fiber-reinforced synthetic material of large geometric dimensions, in particular a reinforcement beam for a curved ring frame, a curved ring frame segment or the like, in particular one comprising a carbon fiber-reinforced epoxy resin and with substantially optimum mechanical properties. Alternatively, it is also possible to employ glass fibers, aramid fibers or the like for armoring. In addition, it is also possible to employ other curable synthetic materials, i.e., resin systems. In this context, polyester resins, BMI resins and the like should be mentioned.

Herein, the expression "optimum mechanical properties" means in particular a maximum mechanical strength of the component at minimum weight. In order to achieve these optimum mechanical properties, the orientation of the fiber reinforcement in the different regions of the component should consistently follow the different directions of the respectively applied forces and, if possible, exhibit no seams.

Due to the fact that the fiber laminate or the fiber laminates comprise at least one full-area layer with a first fiber direction and at least one full-area layer with a second fiber direction, wherein at least one further layer with a third fiber direction is arranged in a peripheral area of the fiber laminate or the fiber laminates, it is possible to form, through bending or folding of the peripheral area, a reinforcement beam whose base portion or base section is optimal for accepting or receiving shear and/or transverse forces and whose outer portion or outer section is similarly ideal for accepting tensile and/or compression forces, wherein the reinforcement beam may be curved.

Due to the utilization of a fiber laminate whose peripheral area comprises a layer with a third fiber direction, the inventive reinforcement beam can be fabricated in substantially any length, its length being limited only by the course length of the used fiber laminate that can be maximally fabricated.

In one embodiment of the reinforcement beam, the fiber laminate is made of a plurality of fibers, in particular of a multi-axial fiber laminate with carbon fibers, glass fibers, aramid fibers or the like.

Using a multi-axial fiber laminate makes it possible to arrange one or several additional layers with a third fiber direction, for example with a fiber direction of 0° in particular in a peripheral area of the fiber laminate, in order to optimally receive or accept shear and/or compression forces, while the other full-area layers have, for example, a fiber direction of ±45° for ideal reception of shear and/or trans-verse forces. Other fiber direction between +20° and +70° as well as between −70° and −20° are also possible. Furthermore, use of an "endless" multi-axial areal laminate made of carbon fibers makes it possible to form spatially extended reinforcement beams, which can serve in particular as ring frames or ring frame segments. The different fiber types can be formed in view of the requirements of the reinforcement beam to be manufactured.

The object of the present invention is furthermore solved by a method according to patent claim 13.

This method for manufacturing a reinforcement beam, in particular a curved ring frame segment for a fuselage cell of an aircraft, comprising a synthetic material that is reinforced by at least one fiber laminate, wherein the fiber laminate comprises at least one full-area layer with a first fiber direction and at least one full-area layer with a second fiber direction, as well as at least one further layer with a third fiber direction arranged in a peripheral area, comprises the following steps:

laying the peripheral area of at least one fiber laminate onto a curved support, bending a base area of the fiber laminate to form an outer portion of an L-blank with an L-shaped cross section, impregnating the L-blank with a curable synthetic material and curing the L-blank.

In accordance with this inventive method, it is possible to manufacture, for example using the "resin transfer molding" (RTM) method, a reinforcement beam of virtually any curvature, for example of a carbon fiber reinforced synthetic material, and with a cross-sectional shape that is for example L-shaped, wherein the reinforcement beam is particularly suited for receiving or accepting in its base area shear and/or transverse forces and the reinforcement beam is particularly optimized for receiving or accepting in its outer portion tensile and/or compression forces. The expression "draping" means that the base portion of the fiber laminate, in which substantially only layers with a fiber direction of ±45° are arranged, can be laid in a curved or bent manner on a support in the horizontal plane without forming creases or folds, so that also curved ring frame segments with a smaller radius of curvature can be manufactured easily.

Herein, due to the use of a virtually endless band-shaped fiber laminate, it is possible to manufacture the reinforcement beam with almost any length, in particular to manufacture large ring frames with only one joint. Reinforcement beams formed in this manner are in particular suitable as ring beam segments of various radii of curvature, that are made, for example, of carbon fiber-reinforced epoxy resin, in order to save weight. In addition, a reinforcement beam made in accordance with the inventive method has virtually "optimum mechanical properties", due to the different directions of the fiber reinforcement in the different regions.

Finally, the object of the present invention is also solved by an areal structure with the features of claim 20.

Due to the fact that the layers with the first and the second fiber direction are full-area layers and the layer or layers with the third fiber direction are arranged in a peripheral area of the fiber laminate, it is possible to form with the inventive areal structure, by simple folding or bending of the peripheral area to form an outer portion and subsequent draping of the remaining base portion, a reinforcement beam that can have virtually any curvature, even in the case of large geometric dimensions. Furthermore, the reinforcement beam formed with the inventive fiber laminate is suitable in particular for loads leading to shear and/or transverse forces in its base portion, while the reinforcement beam is suitable in particular for receiving tensile and/or compression forces in its outer portion, that are in particular common during flight when using the reinforcement beam as a ring frame or ring frame segment in a fuselage cell of an aircraft.

BRIEF DESCRIPTION OF THE DRAWINGS

FIGS. 9-17 are cross-sectional views of various embodiments of L-blanks, Z-blanks and C-blanks

DETAILED DESCRIPTION OF THE INVENTION

The following is an explanation of an inventive reinforcement beam, a fiber laminate used for manufacturing the same, and a method for manufacturing the reinforcement beam.

Figure 1:
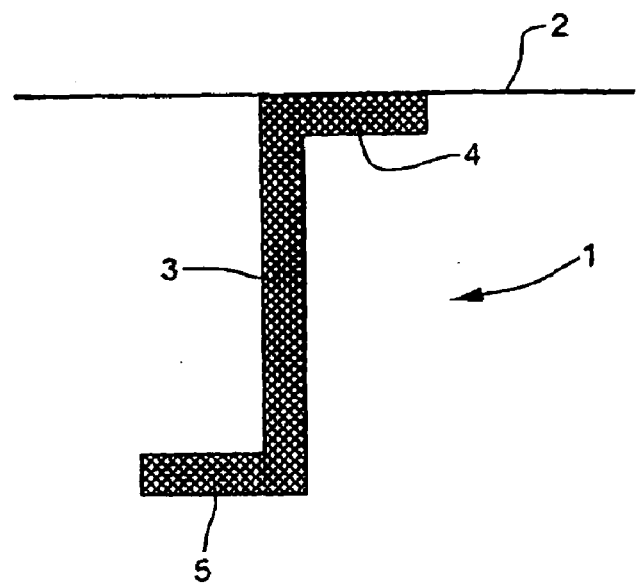
FIG. 1 shows a cross-sectional view of a reinforcement beam with a Z-shaped cross section.

FIG. 1 is a cross-sectional view of a reinforcement beam with a Z-shaped cross section, which is used for example as a ring frame for the reinforcement of fuselage cells in aircraft.

In the embodiment shown in FIG. 1, a reinforcement beam 1 has a substantially Z-shaped cross section. The reinforcement beam 1 serves in particular to reinforce a fuselage cell (not shown in the drawings) of an aircraft and is connected with a paneling or planking 2 for this purpose. In flight, particularly shear and/or transverse forces act on a base portion 3. In an outer portion 4, the reinforcement beam 1 is mainly subjected to tensile stress, whereas in an outer portion 5 mainly compression stress arises. Moreover, the reinforcement beam 1 is also subjected to bending moments. The reinforcement beam 1 is made by soaking or impregnating a Z-blank not shown in FIG. 1 with a curable synthetic material, the Z-blank being made by shaping an initially planar fiber laminate. Herein, the curable synthetic material forms a matrix, into which the individual fibers of the fiber laminate forming the Z-blank are embedded from all sides.

Figure 2:
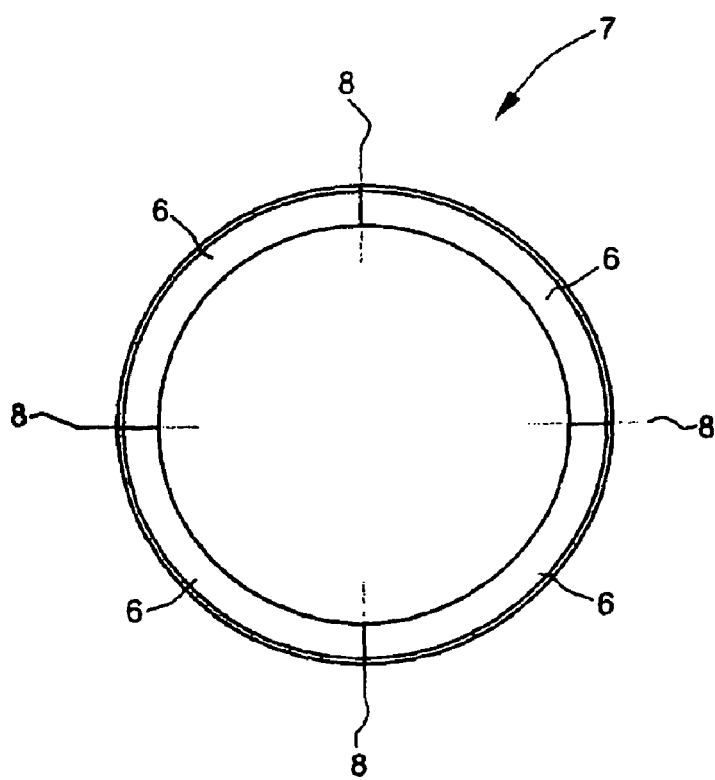
FIG. 2 shows a plan view of a ring frame made of four reinforcement beam segments with an L-shaped cross section.

FIG. 2 shows a ring frame 7 made of a total of four curved reinforcement beams 6 that are assembled together, which can be used for example to reinforce a fuselage cell of an aircraft.

Different to the reinforcement beam 1 in FIG. 1, which has a Z-shaped cross section, the reinforcement beam 6 in FIG. 2 has an L-shaped cross section. The segmentation of the ring frame 7 that is shown in the figure, is not necessarily required, since the inventive reinforcement beam 6 can be manufactured curved into virtually any dimensions, i.e. with a wide range of curvature radii. The reinforcement beams 6 are connected to each other at joints 8 with connection means that are not shown.

Figure 3:
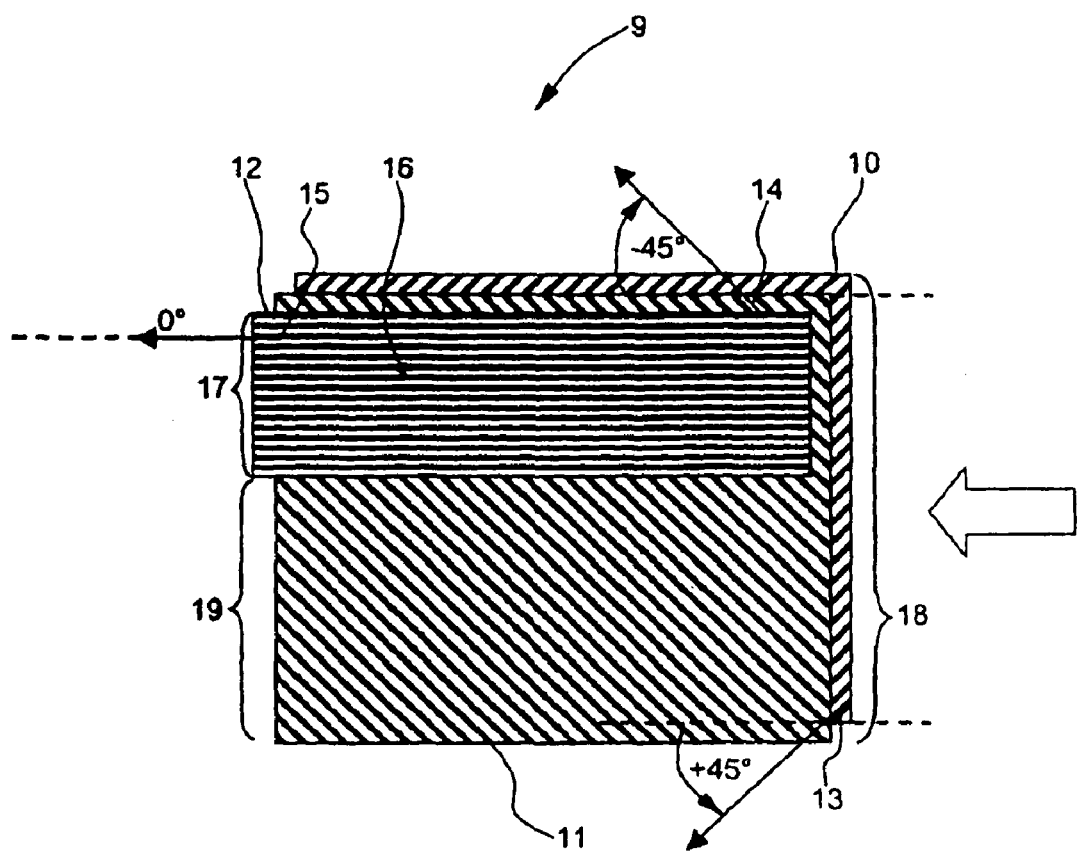
FIG. 3 is a plan view of a fiber laminate for forming reinforcement beams.

For the sake of clarity, FIG. 3 is a plan view shown in slightly offset perspective of a fiber laminate comprising several layers used for fabricating reinforcement beams in accordance with the present invention. The fiber laminate is made of a plurality of multi-axially arranged carbon fibers, glass fibers, aramid fibers or the like that are arranged in several layers provided on top of each other.

In the embodiment shown in FIG. 3, the fiber laminate 9 comprises a total of three layers 10, 11 and 12. In the layer 10, a plurality of fibers, one of which is denoted as a representative fiber by the reference numeral 13, are arranged at a fiber direction of +45°. In the layer 11 arranged on top of that, a plurality of fibers, one of which is denoted as a representative fiber by the reference numeral 14, are arranged at a fiber direction of −45°, so that for example the fibers 13 and 14 in the layers 10 and 11 overlap each other at an angle of approximately 90°. Finally, in the third layer 12, a plurality of fibers, one of which is denoted as a representative fiber by the reference numeral 15, are arranged with a fiber direction of 0°.

In an actual embodiment, the layers of the fiber laminate 9 are arranged flush on top of each other. The denoted angles of ±45 and 0° have been determined respectively between the fibers of the individual layers and the horizontal, taking the fibers 13, 14 and 15 as an example. During the industrial manufacturing process, an areal laminate is manufactured first, from which several fiber laminates 9 can be cut off by cutting in the longitudinal direction. These fiber laminates 9 are then adjusted to a suitable length by cutting in a transverse direction, so that for example ring frames of a suitable diameter or the like can be formed. The production direction of the fiber laminate 9 is indicated by the large arrow.

The layers 10 and 11 with the fiber direction of ±45° serve mainly to receive shear and/or transverse forces. By contrast, the third layer 12 with the fiber direction of 0° mainly receives tensile and/or compression forces as well as bending moments, due to the structural conditions.

The fiber laminate 9 shown in FIG. 3 is referred to as a so-called "−/+" fiber laminate, because its upper layer 11 comprises fibers with a fiber direction of −45°. On the other hand, if the sequence of the layers 10 and 11 is exchanged such that the layer 10 with the fiber direction of +45° is on top, then in accordance with this definition, it is a "+/−" fiber laminate or a ±45° fiber laminate. This differentiation is in particular of considerable relevance with regard to the symmetry of inventive reinforcement beams made of the fiber laminates. When designing components of compound materials, such as in the manufacture of reinforcement beams with fiber-reinforced synthetic materials, it is generally desirable that the fiber direction on the top side of the component—if at all possible—corresponds to the fiber direction on the bottom side of the component. For example, if two "−/+" fiber laminates 9 are placed on top of each other, then this design condition cannot be met, as can be easily seen from the layer sequence "−/+|−/+" The same is also true for the combination "+/−|+/−". If, on the other hand, the "−/+" fiber laminate 9 is placed on a "+/−" fiber laminate, then this boundary condition is met, since the fiber directions on the top side and the bottom side agree in the combination "−/+|+/−".

The fibers within the layers 10, 11 and 12 are arranged to run substantially parallel to each other. The individual layers 10, 11 and 12 of the fiber laminate 9 are connected to each other by tacking threads that are not shown. If using a suitable binder, it is also possible to omit the tacking threads entirely or at least partially. The band-shaped multi-axial fiber laminate 9 extends in horizontal direction in FIG. 3 over virtually any desired length, that length, however, being limited by the manufacturing technology, in particular the furling capability and/or the transport weight.

Each of the layers 10 and 11 is a full-area layer (i.e. it extends over the full area), whereas the third layer 12 extends merely over a peripheral area 16. The width 17 of the peripheral area is significantly smaller than the total width 18 of the fiber laminate 9. The layers 10 and 11 with fibers in the ±45° fiber direction are arranged in a base area 19 of the fiber laminate 9. In accordance with an inventive method, to form an L-blank with an L-shaped cross section, the base area 19 is once bent and draped. Herein the expression "draped" means the curved laying out of the base area 19 in a plane without forming creases or folds. The width of the base area 19 of the fiber laminate 9 is given by the difference between the total width 18 and the width 17 of the peripheral area.

The ratio between the width 17 of the peripheral area and the total width 18 of the fiber laminate 9 is between 0.05 and 0.5 in this example. Furthermore, the fiber laminate 9 typically comprises a larger number of parallel stacked layers 10, 11 and 12 than is shown in FIG. 3.

Different to the arrangement shown in FIG. 3, it is alternatively also possible to arrange the layer 12 with the 0° fiber direction between the layer 10 and the layer 11. And different from the above-mentioned fiber directions of 0°, +45° and −45°, other fiber directions may be advantageous for particular applications. For other applications, fiber directions in a range of between 20° and 70° or between −70° and −20° are possible and may be advantageous in particular applications. Different to the shown embodiment, the fiber laminate 9 may comprise any sequence and number of layers with fibers in fiber directions of 0°, +45° and −45°, or fiber directions different therefrom.

The total width 18 of the fiber laminate 9 may also be merely a part of a larger manufacturing width, so that for example two fiber laminates formed corresponding to the configuration of the fiber laminate 9 each form a partial area of a larger wider fiber laminate. In this case, the fiber laminate comprises two peripheral areas with fibers of 0° fiber direction. Depending in particular upon the manufacturing width and/or the width of the peripheral area, a fiber laminate may comprise any number of peripheral areas.

In accordance with the inventive method, it is possible to first form a simple L-blank from the fiber laminate 9 by bending or folding the peripheral area 16 or the base area 19 to form a reinforcement beam with an L-shaped cross section (see FIG. 4), wherein the L-blank is impregnated with a curable synthetic material, such as an epoxy resin, a polyester resin, a BMI resin or the like, to form the reinforcement beam.

Figure 4:
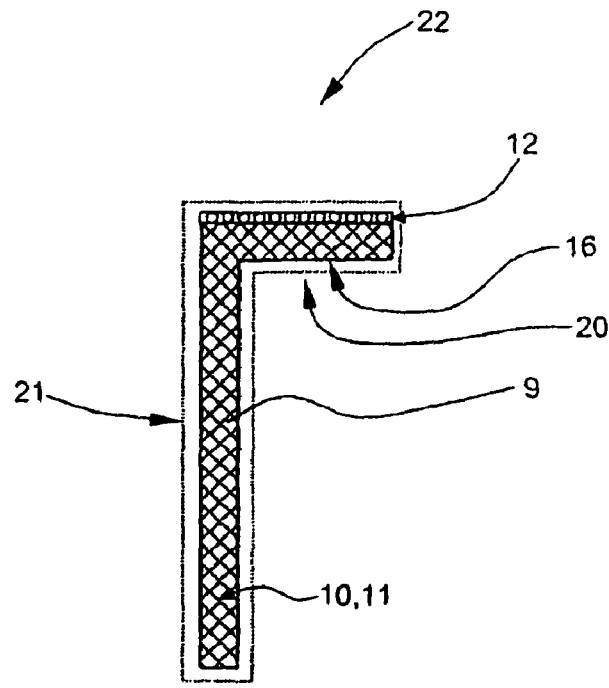
FIG. 4 is a cross-sectional view of a reinforcement beam with an L-shaped cross section.

FIG. 4 shows a cross section of a reinforcement beam having an L-shaped cross section, that is made of a fiber laminate shaped into an L-blank.

The reinforcement beam 22 made from the fiber laminate 9 by soaking or impregnation with the curable synthetic material comprises an outer portion 20 and a base portion 21. The outer portion 20 arises from the planar fiber laminate 9 by bending or folding the peripheral area 16. Accordingly, the base portion 21 comprises the remaining area of the fiber laminate 9. The substantially L-shaped cross section of the reinforcement beam 22, which is defined by the L-blank, is merely one example of many possible cross sectional shapes. For the sake of illustration, the reference numerals corresponding to those in FIG. 3 are also given in FIG. 4 for the layers 10, 11 and 12, as representative layers for the in reality much larger number of layers in the fiber laminate 9.

Thus in accordance with the present invention, only layers with a fiber direction of ±45°, allowing an optimum reception of shear and/or transverse forces that occur in operation mainly in these regions of the reinforcement beam 6, are arranged in the base portion 21 of the reinforcement beam 22. In addition to the layers 12 with a fiber direction of ±45°, layers with a fiber direction of 0° allowing a virtually ideal reception of tensile and/or compression forces as well as bending moments which occur mainly in these regions of the reinforcement beam, are present in the peripheral portion 20 of the reinforcement beam 22. This spatially differentiated arrangement of layers with respectively different fiber directions enables a very high mechanical strength of the beam 22 that is reinforced with the fiber laminate 9 while simultaneously achieving a minimal weight. In addition, it is also possible to arrange discrete fiber bundles ("rovings") made of carbon fibers, glass fibers, aramid fibers or the like in the peripheral portion, in particular in order to increase the compression and tensile strength in this area.

Furthermore, the layers with a preferable fiber direction of ±45° that are present in the base area 21 enable the draping of the fiber laminate 9, which makes it possible to manufacture curved reinforcement beams 22 of virtually any curvature radius and moreover large longitudinal dimensions. In this context, the term "draping" means that sections of the fiber laminate 9, in which only layers with a fiber direction of ±45° are arranged, can be laid out in a curved manner in a plane, without forming creases or folds. Due to the draping, the fibers, which are initially arranged substantially equidistantly to each other and in parallel in the respective layers of the multi-axial fiber laminate, may slightly change their respective orientations and/or the distance to each other.

The soaking or impregnating of the L-blank made of the fiber laminate 9 with a curable synthetic material, such as an epoxy resin, a polyester resin or the like, in order to manufacture the reinforcement beam 22, is performed for example in a closed mold in accordance with a process known as "resin transfer molding" (RTM). Alternatively, the reinforcement beam 22 may also be formed by impregnating the fiber laminate 9 with the curable synthetic material in a vacuum bag, which is placed in a furnace or an autoclave. Curing may also be performed at ambient temperature or within a heatable tool.

It is particularly advantageous that the fiber laminate 9 that is available in virtually any length can be used to manufacture correspondingly long reinforcement beams 22 of any curvature, for example for ring frames with only one joint.

Figure 5:
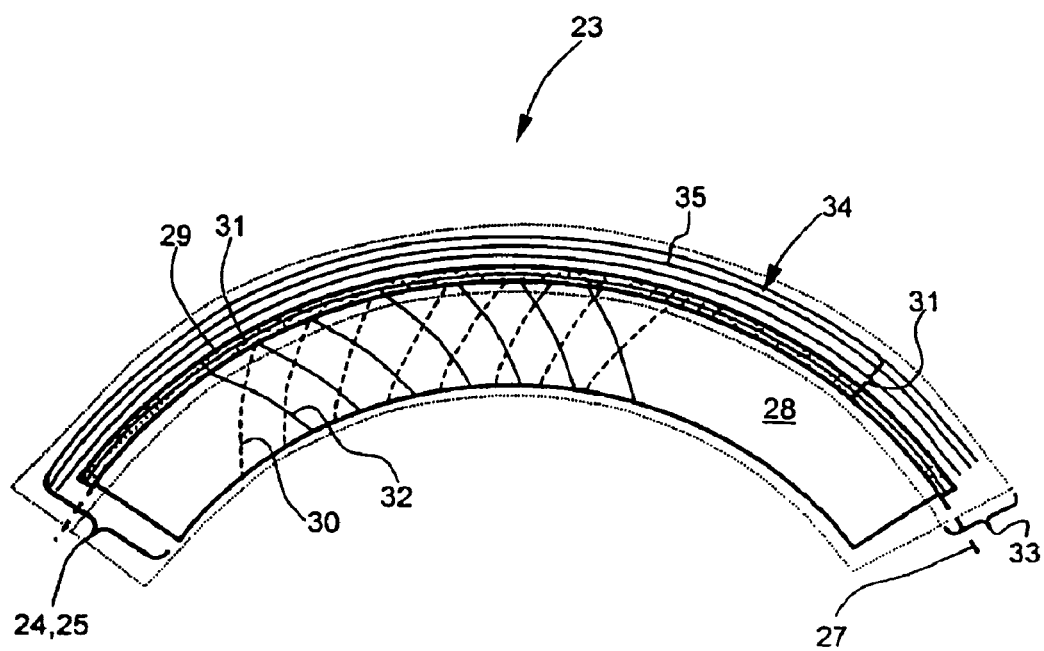
FIG. 5 is a plan view of a curved section of a reinforcement beam with an L-shaped cross section.

FIG. 5 is a plan view of a curved reinforcement beam with an L-shaped cross section.

The reinforcement beam 23 is made with an L-blank having a L-shaped cross section. As explained above, the L-blank 24 is made of a fiber laminate 25 by bending or folding the peripheral portion 26 along the boundary line 27 at an angle of 90° with respect to the paper plane and subsequent draping of the remaining area, in which only fibers with a fiber direction of ±45° are arranged, in order to generate the curvature. After this, the L-blank is soaked in a known process with the curable synthetic material.

The reinforcement beam 23 comprises a base portion 28 with a layer 29 including a plurality of fibers arranged in a fiber direction of +45°. As a representative fiber, one of the fibers within the layer 29 is denoted with the reference numeral 30. Above the layer 29, there is a layer 31 with a plurality of fibers arranged in a fiber direction of −45°. As a representative fiber, one of the fibers within the layer 31 is denoted with the reference numeral 32. In an outer portion 33, the layers 29 and 31 with fibers having a fiber direction of ±45° are shown in a considerably simplified manner by cross-hatching. The true orientation of fibers with a fiber direction of ±45° may deviate from that shown in the drawing. On top of the layers 29 and 31, a layer 34 including a plurality of fibers with a fiber direction of 0° is arranged in the region of the outer portion 33. These fibers substantially follow the circumferential contour of the curved reinforcement beam 23. As a representative fiber, one of the fibers in the layer 34 is denoted by the reference numeral 35. In accordance with the explanations of the embodiment shown in FIG. 3, the layer 34 with the fiber arranged in a fiber direction of 0° may also be arranged between the layers 29 and 31 or beneath them.

In the region of the base portion 28, in particular shear and/or transverse forces as well as torques act during flight on the reinforcement beam 23, which may be used for example as a ring frame for reinforcing fuselage cells of aircraft, whereas in particular tensile and/or compression forces act on the reinforcement beam 23 in the outer portion 23. Therefore, in the base portion 28 as well as in the outer portion 33 of the reinforcement beam 23, the fiber reinforcement is arranged in a virtually ideal manner in order to receive the above-noted forces and torques. Furthermore, this arrangement of the fiber reinforcement also follows the forces acting on these areas, which flow along the circumferential contour of the reinforcement beam 23. Thus, the reinforcement beam 23 can receive a maximum amount of forces at minimum weight.

In order to manufacture the curved reinforcement beam 23 in accordance with an inventive method, first the fiber laminate 25 is placed with the peripheral area 26 onto a support having the same radius of curvature as the bent reinforcement beam 23 to be manufactured. After this, the base portion 28 is folded or bent by 90° with respect to the outer portion 33 and is then draped. In this state, the base portion 28 is arranged parallel to the paper plane, whereas the outer portion 33 encloses an angle of approximately 90° with the paper plane. Subsequently the shaped fiber laminate 25 may be soaked with a curable synthetic material, to form the reinforcement beam 23. The contour of the fiber laminate 25 that is soaked with the curable synthetic material and forms the reinforcement beam 23, is indicated by the dotted line in FIG. 5.

Figure 6:
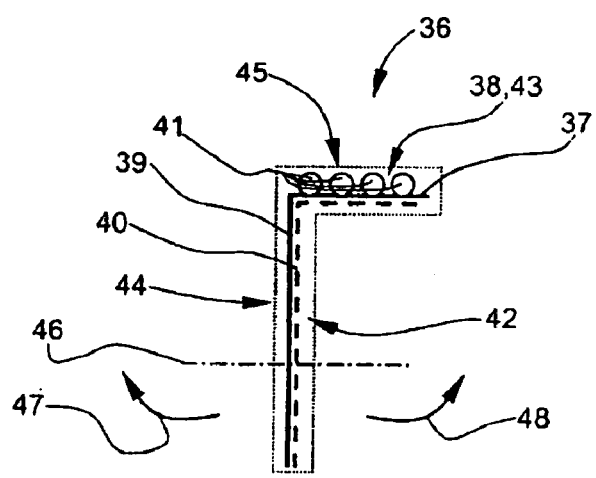
FIG. 6 is a cross-sectional view of a fiber laminate formed into an L-blank.

Referring to FIG. 6 the following explanation focus on an inventive method for manufacturing in particular curved reinforcement beams with at least one fiber laminate and having an L-shaped cross section.

First of all, several narrow, endless fiber laminates, whose configuration and structure corresponds to that shown in FIG. 3, are cut by longitudinal cuts from an industrially pre-manufactured endless fiber laminate having a width of up to 6 m. After this, at least one section that is sufficiently long to manufacture the desired reinforcement beam is severed by a lateral cut from one of the narrow, endless fiber laminates, so that a fiber laminate in accordance with FIG. 3 is obtained. It is possible to use a plurality of such fiber laminates in order to manufacture the inventive reinforcement beam.

To manufacture the reinforcement beam 36, first of all such a fiber laminate 37 is placed with its peripheral area 38, which includes a layer 39 with fibers arranged in a fiber direction of +45°, a layer 40 with fibers arranged in a direction of −45° as well as at least one layer 41 with a fiber direction of 0°, onto a support that is curved in accordance with the construction requirements, in order to obtain the desired curvature radius. After this, the region 42 of the fiber laminate 37, which includes only the layers 39 and 40 with fibers arranged in a fiber direction of ±45°, is bent or folded and then draped in this area in order to fabricate the curvature. Thus, a curved L-blank 43 with an initial simple L-shaped cross section is obtained.

By soaking with the curable synthetic material, the L-blank 43 is turned into the reinforcement beam 36 having an L-shaped cross section, which includes a base portion 44 and an outer portion 45 arranged substantially orthogonally thereto. At least one layer 39 with a fiber direction of +45° as well as a layer 40 with a fiber direction of −45° is arranged in the base portion 44 due to the inventive fiber distribution. In addition to the layers 39 and 40, the layer 41 with fibers arranged in a fiber direction of 0° is present in the outer portion 45.

Prior to the soaking with the curable synthetic material, the L-blank 43 may be bent in the region of the line 46 in the direction of arrow 47 to form a Z-blank or in the direction of arrow 48 by 90° in order to form a C-blank. Thus, it is possible to form in an easy manner Z-blanks and C-blanks to manufacture reinforcement beams of corresponding cross sections. By combining L-blanks, Z-blanks, and C-blanks prior to the soaking with resin, it is furthermore possible to form reinforcement beams with more complex cross-sectional shapes.

Thus, the inventive method makes it possible to manufacture curved reinforcement beams of virtually any length with a large breadth of variations in their cross-sectional shapes, whose length is limited only by the length of the available strip-shaped or web-shaped fiber laminate. This way, it is possible to form for example large ring frames for reinforcing fuselage cells of aircraft with very large diameter having only a single joint in a simple manner. Alternatively, it is also possible to form seamless ring frames through multiple overlapping reeling off of fiber laminates onto a suitable support followed by resin impregnation.

Figures 7, 8:
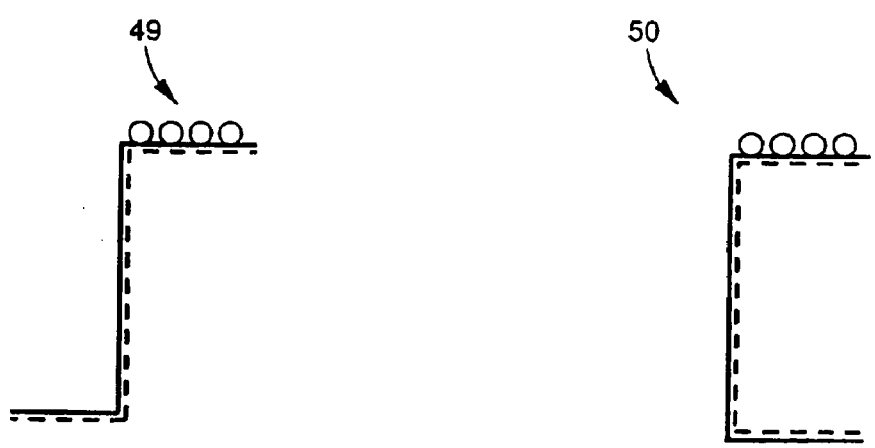
FIG. 7 is a cross-sectional view of a fiber laminate formed into a Z-blank.
FIG. 8 is a cross-sectional view of a fiber laminate formed into a C-blank.

FIG. 7 is a schematic view showing how a Z-blank 49 can be formed from the L-blank 36 by bending along the line 46 in the direction of arrow 47 (see FIG. 6). This Z-blank 49 includes a layer with fibers arranged in a fiber direction of +45° indicated by the solid line, a layer with fibers arranged in a fiber direction of −45° indicated by the broken line and a layer with fibers arranged in a fiber direction of 0° indicated by circles.

FIG. 8 also shows a schematic view illustrating how a C-blank 50 can be formed by bending along the line 46 in the direction of arrow 48 (see FIG. 6). Similar to the diagram in FIG. 7, the C-blank 50 includes a layer with fibers arranged in a fiber direction of +45° indicated by the solid line, a layer with fibers in a fiber direction of −45° indicated by the broken line and a layer with fibers arranged in a fiber direction of 0° indicated by circles.

In the FIGS. 6, 7, and 8, virtually any sequence of layers is possible. By soaking with the curable synthetic material, the Z-blank 49 and the C-blank 50 can be formed into curved reinforcement beams of corresponding cross-sectional shape, as necessary.

FIGS. 9 to 17 show L-blanks, Z-blanks and C-blanks in three variations each, in which the sequence of the layers is varied. The representation of the layers of different fiber directions in the drawings corresponds to their representation in the FIGS. 6 to 8. In the FIGS. 9 to 17, layers with fibers arranged in a fiber direction of 0° are represented by circles, layers with fibers arranged in a fiber direction of +45° are represented by solid lines and layers with fibers arranged in a fiber direction of −45° are represented by broken lines.

In the left column the layers with fibers arranged in a fiber direction of 0° are disposed on top of the layers with fibers arranged in a fiber direction of +45°. In the column in the middle, the layers with fibers arranged in a fiber direction of 0° are respectively disposed between the layers with the fiber direction of +45° and the layers with the fiber direction of −45°. On the other hand, in the right column, the layers with fiber arranged in a fiber direction of 0° are placed beneath the layers with the fibers arranged in a fiber direction of −45°. Herein, the general design rule for fiber-reinforced compound components applies, according to which in particular for reasons of symmetry layers with fibers arranged in the same fiber direction should be arranged in the region of the upper side and of the lower side of a completed compound component. If, for example, a base material (fiber laminate) has the layer sequence +/−/0, then in general, a second material (fiber laminate) with the layer sequence 0/−/+ is necessary, in order to satisfy the symmetry condition. Herein "+" stands for a layer with fibers arranged in a fiber direction of +45°, "−" stands for a layer with fibers arranged in a fiber direction of −45° and "0" stands for a layer with fibers arranged in a fiber direction of 0°. Needless to say, it is also possible to chose angles deviating from the angles ±45° and 0°.

By soaking with the curable synthetic material, it is possible to form reinforcement beams having a corresponding cross-sectional shape and a corresponding layering sequence, from the blanks according to the FIGS. 9 to 17.

Figure 18:
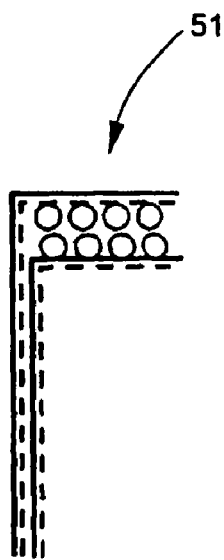
FIGS. 18-20 illustrate the formation of reinforcement beams with more complex cross-sectionals shapes by combining L-blanks, Z-blanks and C-blanks.
Figure 19:
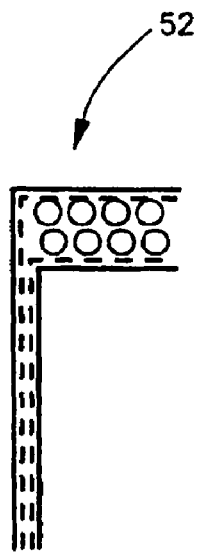
Figure 20:
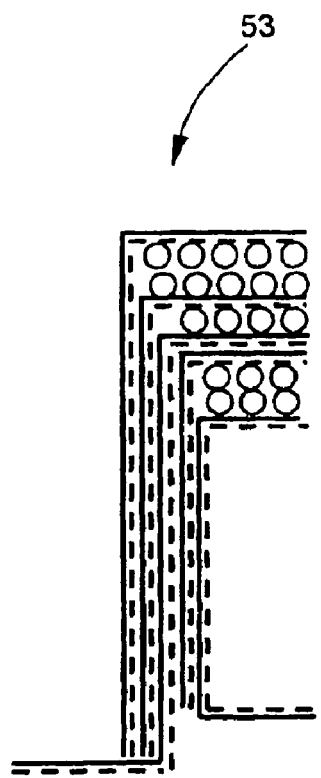

The FIGS. 18 to 20 illustrate how reinforcement beams having cross-sectional shapes of virtually any complexity and, if necessary, curved shapes can be made from the L-blanks, the Z-blanks and the C-blanks by combining them in a suitable manner. Herein, it is preferable that the blanks are combined with each other prior to the soaking with the curable synthetic material.

For example the L-blank 51 shown in FIG. 18 is formed by combining the L-blank in FIG. 11 with the L-blank according to FIG. 9. In contrast to the configuration of the L-blank 51 in FIG. 18, the L-blank 52 in FIG. 19 has a symmetric configuration, since the fiber directions on its upper side and its lower side are the same.

Correspondingly, the complex cross-sectional shape of the blank 53 according to FIG. 20 can be formed by combining the blanks of the FIGS. 11, 9, 15, 11 and 12. If necessary, also the blank 53 can be configured symmetrically, like the L-blank 52 in FIG. 19, i.e., have the same fiber directions on its upper side and its lower side.

The present invention relates to a reinforcement beam 1, 6, 22, 23, 36, in particular curved ring frame segment for fuselage cells of aircraft, comprising a synthetic material that is reinforced by at least one fiber laminate 9, 25, 37, wherein the fiber laminate 9, 25, 37 or fiber laminates 9, 25, 37 comprise at least one full-area layer 10, 29, 39 with a first fiber direction and at least one full-area layer with a second fiber direction 11, 31, 40, and wherein at least one further layer 12, 34, 41 with a third fiber direction is arranged in a peripheral area 16 of the fiber laminate 9, 25, 37 or fiber laminates 9, 25, 37.

The layers 10, 11, 29, 31, 39, 40 of the first and the second fiber direction may be arranged in a base portion 3, 21, 28, 44 of the reinforcement beam 1, 6, 22, 23, 36 that is mainly subjected to shear forces and/or transverse forces.

Layers 10-12, 29, 31, 34, 39-41 of the first and the second fiber direction as well as the third fiber direction may be arranged in an outer portion 4, 5, 20, 33, 45 of the reinforcement beam 1, 6, 22, 23, 36 that is mainly subjected to tensile forces and/or compression forces.

Furthermore, the layers 10-12, 29, 31, 34, 39-41 may each be formed with a plurality of fibers 13-15, 30, 32, 35 that are arranged substantially in parallel and equidistantly to each other.

The first fiber direction may be in a range of +20° to +70°.

The second fiber direction may be in a range of −70° to −20°.

The third fiber direction may be substantially 0°.

The base portion 3, 21, 28, 44 may be capable of being draped for manufacturing curved reinforcement beams 1, 6, 22, 23, 36.

The base portion 3, 21, 28, 35 and the outer portion 4, 5, 20, 33, 45 of the reinforcement beam 1, 6, 22, 23, 36 may define an angle of approximately 90°, forming an L-shaped cross section.

The reinforcement beam 1, 6, 22, 23, 36 may be bent at least once in the area of the base portion 3, 21, 28, 44, in particular to form a Z-shaped or a C-shaped cross section.

The fiber laminate 9, 25, 37 may be formed with a plurality of fibers 13-15, 30, 32, 35, in particular with a multi-axial fiber laminate of carbon fibers, glass fibers, aramid fibers or the like.

The synthetic material may be a curable synthetic material, in particular an epoxy resin, a polyester resin, a BMI resin or the like.

The invention further relates to a method for manufacturing a reinforcement beam 1, 6, 22, 23, 36, in particular a curved ring frame segment for a fuselage cell of aircraft, comprising a synthetic material that is reinforced by at least one fiber laminate 9, 25, 37, wherein the fiber laminate 9, 25, 37 comprises at least one full-area layer 10, 29, 39 with a first fiber direction and at least one full-area layer 11, 31, 40 with a second fiber direction, as well as at least one further layer 12, 34, 41 with a third fiber direction in at least one peripheral area 16, 26, 38, the method comprising the following steps:

laying the peripheral area 16, 26, 38 of at least one fiber laminate 9, 25, 37 onto a curved support, bending a base area 19 of the fiber laminate 9, 25, 37 to form a blank, in particular an L-blank 43, 51, 52 having an L-shaped cross section, impregnating the blank with a curable synthetic material and curing the blank.

The base area 19 of at least one L-blank 43, 51, 52 may be bent at least once prior to the curing, in particular to form a Z-blank 49 having a Z-shaped cross section or a C-blank 50 having a C-shaped cross section.

L-blanks 43, 51, 52, Z-blanks 49 or C-blanks 50 may be combined with each other to form reinforcement beams 1, 6, 22, 23, 36 having a complex cross section, preferably prior to the impregnation with the curable synthetic material.

Mainly layers 10, 11, 29, 31, 39, 40 of the first and the second fiber direction may be arranged in the base portion 3, 21, 28, 44 of the reinforcement beam 1, 6, 22, 23, 36, which is mainly subjected to shear forces and/or transverse forces.

Mainly layers 10, 12, 29, 31, 34, 39-41 of the first and the second fiber direction as well as the third fiber direction may be arranged in the outer portion 4, 20, 33, 45 of the reinforcement beam 1, 6, 22, 23, 36, which is mainly subjected to tensile forces and/or compression forces.

The fiber laminate 9, 25, 37 may be formed with a plurality of fibers 13-15, 30, 32, 35, in particular with a multi-axial fiber laminate of carbon fibers, glass fibers, aramid fibers or the like.

In particular an epoxy resin, a polyester resin, a BMI resin or the like may be used to impregnate the fiber laminate 9, 25, 37 or the fiber laminates 9, 25, 37.

The invention furthermore relates to a fiber laminate 9, 25, 37 for manufacturing a reinforcement beam 1, 6, 22, 23, 36, in particular a ring frame segment, wherein the fiber laminate 9, 25, 37 comprises at least one layer 10, 29, 39 with a first fiber direction and at least one layer 11, 31, 40 with a second fiber direction, as well as a further layer 12, 34, 41 with a third fiber direction, wherein the layers 10, 11, 29, 31, 39, 40 with the first and the second fiber direction are full-area layers and the layer 12, 34, 41 or layers 12, 34, 41 with the third fiber direction is arranged in a peripheral area 16, 26, 38 of the fiber laminate 9, 25, 37.

The fiber laminate 9, 25, 37 may be strip-shaped or web-shaped.

The individual layers 10-12, 29, 31, 34, 39-41 of the fiber laminate 9, 25, 37 may each comprise a plurality of fibers 13-15, 30, 32, 35 that are arranged substantially in parallel and equidistantly to each other.

The first fiber direction may be in a range of +20° to +70°, in particular to accept shear and/or transverse forces.

The second fiber direction may be in a range of −70° to −20°, in particular to accept shear and/or transverse forces.

The third fiber direction may be approximately 0°, in particular to accept tensile and/or compression forces.

The ratio between a width (17) of the peripheral area and a total width (18) of the fiber laminate (9, 26, 37) may be between 0.05 and 0.5.

The fiber laminate 9, 26, 37 may be formed with a plurality of fibers 13-15, 30, 32, 35, in particular with a multi-axial fiber laminate of carbon fibers, glass fibers, aramid fibers or the like.

What is claimed is:

1. A method for manufacturing a curved reinforcement beam comprising a synthetic material that is reinforced by a fiber laminate, wherein the fiber laminate comprises a base area and a peripheral area, the method comprising the following steps:

providing the fiber laminate, wherein the fiber laminate comprises at least one full-area layer with a first fiber direction which is in a range of +20° to +70°, at least one full-area layer with a second fiber direction which is in a range of −70° to −20° and at least one further partial layer with a third fiber direction which is substantially 0° and substantially follows a circumferential contour of the curved reinforcement beam, wherein the at least one further partial layer extends only over the peripheral area of the fiber laminate, laying the peripheral area of the fiber laminate onto a curved support, wherein layers with the first, the second and third fiber direction are arranged in the peripheral area, bending and subsequent draping of the base area of the fiber laminate, wherein only layers with the first and the second fiber direction are arranged in the base area, to form a curved L-blank having an L-shaped cross section, wherein the base area and the peripheral area of the fiber laminate define an angle of approximately 90° after bending and draping, and wherein the base area is arranged in a plane after bending; and wherein the base area of the fiber laminate of the curved L-blank is further bent by approximately 90° to form a curved Z-blank having a Z-shaped cross section or a curved C-blank having a C-shaped cross section, and impregnating the curved blank with a curable synthetic material and curing the impregnated curved blank to form a curved reinforcement beam.

2. The method according to claim 1, wherein the layers are each formed with a plurality of fibers that are arranged substantially in parallel and equidistantly to each other.

3. The method according to claim 1,
wherein the synthetic material which is used to impregnate the fiber laminate or the fiber laminates is a curable synthetic material.

4. The method according to claim 1,
wherein the curved blanks, which are impregnated with the curable synthetic material and cured, are combined with each other to form curved reinforcement beams having a complex cross section.

5. The method according to claim 1,
wherein the fiber laminate is formed with a plurality of fibers.

6. The method according to claim 1,
wherein the fiber laminate is formed with a multi-axial fiber laminate comprising at least one of carbon fibers, glass fibers and aramid fibers.

7. The method according to claim 1,
wherein at least one of an epoxy resin, a polyester resin and a BMI resin is used to impregnate the fiber laminate or the fiber laminates.

8. The method according to claim 1,
wherein the curved reinforcement beam is a curved ring fame segment for a fuselage cell of aircraft.

* * * * *